United States Patent [19]
Kawamura et al.

[11] 3,964,562
[45] June 22, 1976

[54] STEERING SYSTEM FOR AN ENDLESS TRACK TYPE TRACTOR

[75] Inventors: Eiji Kawamura; Yoshitaka Nishimura; Hisashi Fukumoto, all of Hirakata, Japan

[73] Assignee: Kabushiki Kaisha Komatsu Seisakusho, Tokyo, Japan

[22] Filed: June 10, 1975

[21] Appl. No.: 585,671

[30] Foreign Application Priority Data
June 10, 1974 Japan................................ 49-64916

[52] U.S. Cl................................. 180/6.7; 74/665 T
[51] Int. Cl.².......................................... B62D 11/08
[58] Field of Search.......................... 180/6.7, 6.66; 74/665 T

[56] References Cited
UNITED STATES PATENTS

| | | | |
|---|---|---|---|
| 1,423,642 | 7/1922 | Beal et al............................. | 180/6.7 |
| 2,843,213 | 7/1958 | Schwartz........................... | 180/6.7 X |
| 3,239,020 | 3/1966 | Morris et al. ........................ | 180/6.7 |
| 3,760,896 | 9/1973 | Kawamura et al................... | 180/6.7 |
| 3,785,450 | 1/1974 | Suzuki................................. | 180/6.7 |

Primary Examiner—M. H. Wood, Jr.
Assistant Examiner—Milton L. Smith
Attorney, Agent, or Firm—Armstrong, Nikaido & Wegner

[57] ABSTRACT

Steering system for an endless track type tractor having an engine, a power distribution device for equally distributing the power of the engine to two outputs, a pair of power trains each including a torque converter, a transmission and a steering brake for transmitting the power to each of a pair of lateral shafts adapted to selectively drive an endless track through a sprocket for turning the tractor rightwardly or leftwardly. The transmissions and the steering brakes are hydraulically actuated through hydraulic cylinders and electromagnetic valves controlled by a manually operable steering switch mechanism so as to shift either one of the transmissions to neutral while the related one of the steering brakes is actuated to braking position for the turning of the tractor at a rate determined by the fluid pressure supplied to the hydraulic cylinders. The steering system includes a pair of adjustable treadle pressure reducing valves each connected to the respective hydraulic cylinder for the steering brake and a treadle reducing valve coupled switch mechanism connected in parallel to the respective one of the electromagnetic valves for the steering brakes, thereby permitting the tractor to be turned rightwardly or leftwardly at a selected rate as determined by the degree of actuation of the selected one of the treadle valves.

4 Claims, 3 Drawing Figures

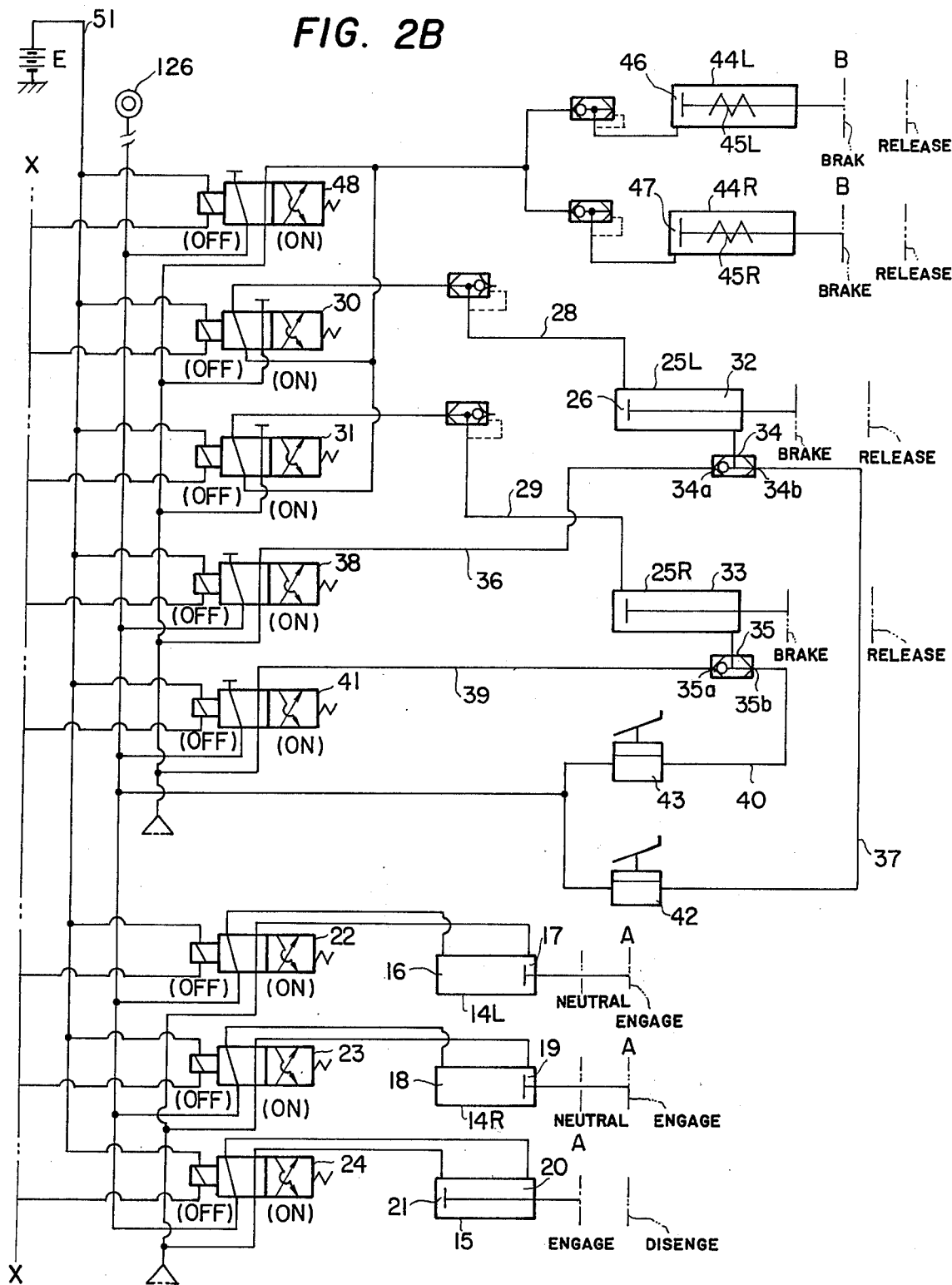

3,964,562

STEERING SYSTEM FOR AN ENDLESS TRACK TYPE TRACTOR

BACKGROUND OF THE INVENTION

The present invention relates to a steering system for an endless track type tractor, and more particularly, to a hydraulic control system of the steering system for the endless track type tractor having dual power trains.

Heretofore, a steering system for an endless track type tractor having dual power trains has been developed in which the transmissions and the steering brakes are hydraulically actuated selectively through the hydraulic cylinders and the electromagnetic valves coupled thereto and controlled by a switch mechansism by the hydraulic fluid pressure supplied from a hydraulic fluid source so as to turn the tractor rightwardly or leftwardly. In such a steering system as described above, since the electromagnetic valves are actuated instantaneously to either one of the two positions the hydraulic fluid of the contstant pressure is instantaneously supplied to the hydraulic cylinders so that the rate of the turning of the tractor, i.e., the radius of curvature of the turning of the tractor is made constant thereby deteriorating the operation of the tractor.

The present invention aims at avoiding the disadvantages of the prior art steering system for an endless track type tractor described above.

SUMMARY OF THE INVENTION

An object of the present invention is to provide a novel and useful steering system for an endless track type tractor which avoids the disadvantages of the prior art steering system as described above.

Another object is to provide a novel and useful steering system for an endless track type tractor described above having dual power trains in which electromagnetic valves and hydraulic cylinders are utilized for actuating the transmissions and the steering brakes for the left- or rightward turning of the tractor and in which the pressure of the hydraulic fluid for actuating the hydraulic cylinders for the steering brakes is made controllable so that the rate of turning, i.e., the radius of curvature of the turning operation of the tractor is optionally varied.

The above objects are achieved in accordance with the present invention by the provision of a steering system for an endless track type tractor having an engine, a power distribution device connected to the engine for equally distributing the power of the engine to two output shafts of the power distribution device, a pair of power trains each connected to the respective one of the output shafts and including a torque converter, a coupling, a transmission, a steering brake for applying braking force to the output shaft of the transmission when the same is shifted to neutral position, a bevel gear mechanism connected to the output shaft of the transmission, a lateral output shaft connected to the bevel gear mechanism so as to be driven by the power of the torque converter through the transmission when the steering brake is in the disengaged position and a final reduction gear mechanism for transferring the power from the lateral output shaft to a sprocket for driving the endless track engaging around a portion of the sprocket, the braking by the steering brake of the output shaft of either one transmission when shifted to neutral position effecting the turning of the tractor rightwardly or leftwardly, a hydraulic fluid source, an electric source, a first pair of hydraulic cylinders each connected to the hydraulic fluid source and coupled with the respective transmission for shifting the same to neutral position upon actuation of the hydraulic cylinder, a second pair of hydraulic cylinders each connected to the hydraulic fluid source and coupled with the respective steering brake for braking the output shaft of the transmission upon actuation of the hydraulic cylinder, a first pair of electromagnetic valves connected to the electric source and each connected between the hydraulic fluid source and the respective hydraulic cylinder of the first pair for actuating the same upon energization of the valve, a second pair of electromagnetic valves connected to the electric source and each connected between the hydraulic fluid source and the respective hydraulic cylinder of the second pair for actuating the same upon energization of the valve, a manually operable steering switch mechanism connected to the electric source and the first and the second pair of electromagnetic valves for selectively energizing either one of the first pair of electromagnetic valves and either one of the second pair of electromagnetic valves so as to apply braking force to the output shaft of either one of the transmissions while the same is shifted to neutral position so that the tractor is turned rightwardly or leftwardly at a rate determined by the hydraulic fluid pressure of the hydraulic fluid source supplied to the second pair of hydraulic cylinders coupled with the respective steering brakes, the steering system being characterized by a pair of adjustable treadle pressure reducing valves each connected between the hydraulic fluid source and the respective one of the second pair of hydraulic cylinders in parallel to the respective electromagnetic valve of the second pair and a treadle valve coupled switch mechanism operably coupled with the respective one of the adjustable treadle pressure reducing valves and connected to the electric source and the first and the second pair of electromagnetic valves in parallel to the manually operable steering switch mechanism thereby permitting selected one of the second pair of hydraulic cylinders to be actuated by either one of the adjustable treadle pressure reducing valves while the second pair of electromagnetic valves are regulated by the manually operable steering switch mechanism so as to supply no fluid to the second pair of hydraulic cylinders with one of the first pair of hydraulic cylinders related to the selected one of the second pair of hydraulic cylinders being actuated to shift the transmission to neutral position so that the tractor is turned rightwardly or leftwardly at a rate determined by the fluid pressure adjusted depending upon the degree of actuation of the adjustable treadle pressure reducing valve.

Other objects and advantages of the present invention will be apparent from reading the following description of the preferred embodiment of the present invention with reference to the accompanying drawings illustrating the same.

BRIEF DESCRIPTION OF THE DRAWINGS

FIGS. 2A and 2B are a hydraulic circuit diagram showing the hydraulic control circuit of the steering system for an endless track type tractor as one embodiment of the present invention.

DETAILED DESCRIPTION OF THE PREFERRED EMBODIMENT

Figure 1:
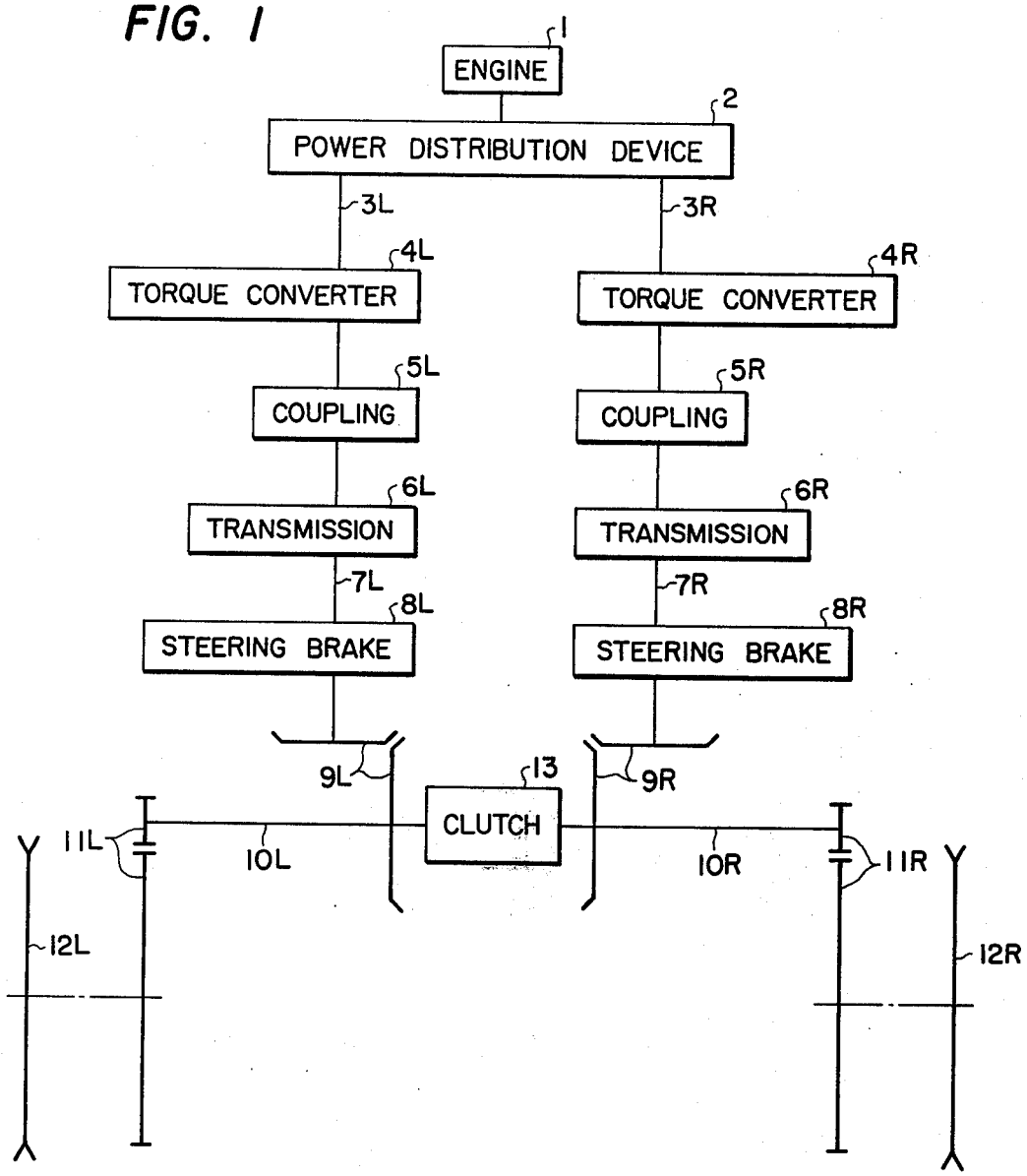
FIG. 1 is a schematic view showing the power trains of the steering system of an endless track type tractor of the present invention.

Referring to FIG. 1, the engine 1 of the tractor is connected to a power distribution device 2 for equally dividing the power of the engine 1 to two output shafts 3L, 3R of the power distribution device 2, and the output shaft 3L is connected to a power train comprising a torque converter 4L, a coupling 5L, a transmission 6L, a bevel pinion coupled with a bevel gear secured to a lateral shaft 10L, the bevel pinion and the bevel gear constituting a bevel gear mechanism 9L, and a final reduction gear mechanism 11L comprising a pinion secured to the lateral shaft 10L and a gear integral with a sprocket 12L by which an endless track (not shown) is adapted to be driven. A steering brake 8L is provided on the output shaft 7L of the transmission 6L.

Similarly, the output shaft 3R is connected to another power train comprising a torque converter 4R, a coupling 5R, a transmission 6R, a bevel gear mechanism 9R consisting of a bevel pinion secured to the output shaft 7R of the transmission 6R on which a steering brake 8R is provided and a bevel gear secured to a lateral shaft 10R, and a final reduction gear mechanism 11R consisting of a pinion secured to the lateral shaft 10R and a gear integral with a sprocket 12R by which an endless track is adapted to be driven.

A lateral shaft engaging clutch 13 may be provided between the adjacent ends of the lateral shaft 10L and the lateral shaft 10R.

Thus, when both the transmissions 6L, 6R are engaged for transmitting the power from the engine 1 through the torque converters 4L, 4R to the lateral shafts 10L, 10R with the lateral shaft engaging clutch 13 being engaged, both the sprockets 12L, 12R are driven at the same speed so that the tractor is driven in straight advance.

On the other hand, when one of the transmissions, say the transmission 6L, is shifted to neutral and the steering brake 8L is actuated to brake the output shaft 7L of the transmission 6L with the lateral shaft engaging clutch 13 being disengaged simultaneously, only the sprocket 12R is driven so that the tractor is turned leftwardly.

Similarly, when the transmission 6R is shifted to neutral and the steering brake 8R is actuated for the braking while the lateral shaft engaging clutch 13 is disengaged, the tractor is turned rightwardly.

Figure 2A:
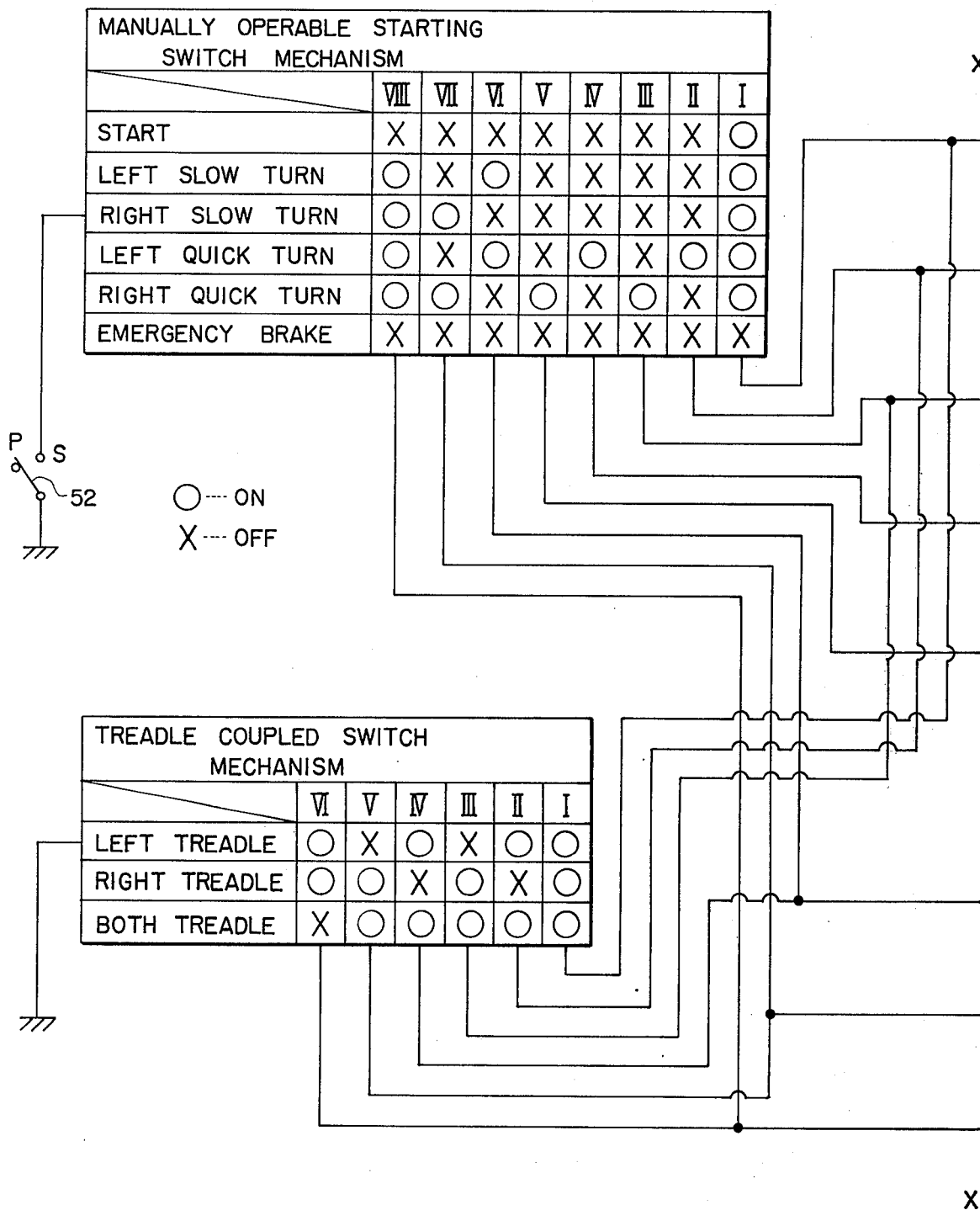

FIGs. 2A and 2B show the hydraulic control circuit for selectively actuating or disengaging the transmissions 6L, 6R, steering brakes 8L, 8R and the lateral shaft engaging clutch 13 as well as a pair of parking brakes (not shown) to be described later.

A first pair of hydraulic cylinders 14L, 14R are mechanically coupled with the transmissions 6L, 6R, respectively, and the first and the second chamber 16, 17 of the cylinder 14L and the first and the second chamber 18, 19 of the cylinder 14R are respectively hydraulically connected through lines and each of the first pair of electromagnetic valves 22, 23 to the hydraulic fluid source 126 and the sump and the electromagnetic valve 22 is electrically connected between the electric source 51 and a manually operable steering switch mechanism 49 which is grounded so as to make electric circuit between the electric source 51 while the electromagnetic valve 23 is electrically connected between the electric source 51 and the manually operable steering switch mechanism 49, so that the electromagnetic valves 22, 23 when selectively energized through the steering switch mechanism 49 by the electric source 51, are switched from the OFF positions to the ON position, respectively.

In the OFF position of the electromagnetic valve 22, the hydraulic fluid pressure is applied to the first chamber 16 of the cylinder 14L so that the transmission 6L is in engaged position A, while, when the electromagnetic valve 22 is switched to ON position through the steering switch mechanism 49, the fluid pressure is supplied to the second chamber 17 of the cylinder 14L while the first chamber 16 is connected to the sump, thereby shifting the transmission to neutral whereby the power of the engine 1 is not transmitted to the output shaft 7L.

In the similar manner, when the electromagnetic valve 23 is in OFF position, the transmission 6R is held in engaged position, while, when the electromagnetic valve 23 is switched to ON position through the steering switch mechanism 49, the transmission 6R is shifted to neutral.

A hydraulic cylinder 15 having a first chamber 21 and a second chamber 20 is mechanically coupled with the lateral shaft engaging clutch 13 and the chambers 20, 21 are hydraulically connected through an electromagnetic valve 24 to the hydraulic fluid source 126 and the sump. The electromagnetic valve 24 is in turn electrically connected between the electric source 51 and the manually operable steering switch mechanism 49 so that, when the electromagnetic valve 24 is in the OFF position as shown, the first chamber 20 is pressurized by the hydraulic fluid from the hydraulic fluid source 126 so that the lateral shaft engaging clutch 13 is held in engaged position A, while, when the valve 24 is switched to the ON position through the steering switch mechanism 49, the clutch 13 is disengaged.

A second pair of hydraulic cylinders 25L, 25R are mechanically connected to the steering brakes 8L, 8R, respectively.

The first chamber 26 of the cylinder 25L is connected through a line 28 to a first port of an electromagnetic valve 30 which is electrically connected between the electric source 51 and the manually operable steering switch mechanism 49 so as to be switched between the OFF position and the ON position through the steering switch mechanism 49. A second port of the valve 30 is connected to the sump, while a third port is connected to a first port of an electromagnetic valve 48, a second port of which is connected to the sump while a third port is connected to the hydraulic fluid source 126. The valve 48 is electrically connected between the electric source 51 and the steering switch mechanism 49 so that it is switched between OFF position and ON position through the steering switch mechanism 49.

The second chamber 32 of the cylinder 25L is connected through the port 34a of a shuttle valve 34 and line 36 to a first port of an electromagnetic valve 38, a second port of which is connected to the sump while a third port is connected to the hydraulic fluid source 126. The valve 38 is electrically connected between the electric source 51 and the manually operable steering switch mechanism 49 so as to be switched between OFF position and ON position.

Thus, when the valve 48 is switched to ON position in the conditions of the valves 48, 30 and 38 as shown in FIGS. 2A and 2B, the fluid pressure is applied from the source 126 through the valve 48, the valve 30, the line 28 to the first chamber 26 of the cylinder 25L while the fluid in the second chamber 32 thereof which has been introduced therein through the valve 38 and the shuttle valve 34 which has thus been held in such position allowing the fluid to flow through the port 34a is drained through the shuttle valve 34 and the valve 38 to the sump, thereby switching the steering brake 8L from the braking position to the released position.

In the similar manner, the first chamber 27 of the cylinder 25R is connected through a line 29 to a first port of an electromagnetic valve 31 which is electrically connected between the electric source 51 and the steering switch mechanism 49. A second port of the valve 31 is connected to the sump while a third port is connected to the first port of the electromagnetic valve 48 in parallel to the valve 30.

The second chamber 33 of the cylinder 25R is connected through the port 35a of a shuttle valve 35 and line 39 to a first port of an electromagnetic valve 41, a second port of which is connected to the sump while a third port is connected to the fluid source 126. The valve 41 is electrically connected between the electric source 51 and the steering switch mechanism 49.

Thus, when the valve 48 is switched to ON position in the positions of the valves 31 and 41 as shown in FIGS. 2A and 2B, the fluid pressure is supplied to the first chamber 27 of the cylinder 25R is pressurized while the fluid in the second chamber 33 is drained in like manner as described in connection with the cylinder 25L so that the steering brake 8R is switched from the braking position to the released position.

The first port of the electromagnetic valve 48 is also connected to the pressure receiving chamber 46 of a hydraulic cylinder 44L mechanically coupled with a leftside parking brake (not shown) as well as to the pressure receiving chamber 47 of a hydraulic cylinder 44R mechanically coupled with a rightside parking brake (not shown). The cylinder 44L is provided with a spring 45L so that the leftside parking brake is normally in braking position B by the action of the spring 45L, but, when the valve 48 is switched to ON position, the pressure receiving chamber 46 is pressurized by the fluid from the valve 48 so that the parking brake is switched to released position against the action of the spring 45L.

In the similar manner, the cylinder 44R has a spring 45R so that the rightside parking brake is normally held in braking position, but, when the valve 48 is switched to ON position, the parking brake is released.

The manually operable steering switch mechanism 49 adapted to be operated at the operator's seat in the tractor controls the various modes of operation such as emergency brake, quick left turn, quick right turn, adjustable slow left turn, adjustable slow right turn, and starting of the tractor as described later.

The suffix "L" or "R" attached to various reference numerals shows that the elements designated thereby belong to the left-side power trains or rightside power trains of the tractor.

In accordance with the characteristic feature of the present invention, a leftside adjustable treadle pressure reducing valve 42 and a rightside adjustable treadle pressure reducing valve 43 are provided which are mechanically coupled with a treadle valve coupled switch mechanism 50 which in turn is connected to the electric source 51 in parallel to the manually operable steering switch mechanism 49.

The input each of the reducing valves 42, 43 is connected to the hydraulic fluid source 126. The outlet of the valve 42 is connected through line 37 to another port 34b of the shuttle valve 34 connected to the second chamber 32 of the cylinder 25L while the outlet of the valve 43 is connected through line 40 to another port 35b of the shuttle valve 35 connected to the second chamber 33 of the cylinder 25R.

Thus, in the positions shown in FIGS. 2A and 2B, when either one of the reducing valves 42, 43 is actuated, the adjustably reduced pressure fluid is applied to either one of the cylinders 25L, 25R independently of the valves 38, 41, so that either one of the steering brakes 8L, 8R is brought to braking position at a rate as determined by the fluid pressure introduced in the cylinder depending upon the degree of actuation of the reducing valve, while, when both the reducing valves 42, 43 are actuated, both the steering brakes 8L, 8R are brought to braking positions thereby stopping the tractor, wherein the transmission relating to the steering brake actuated to braking position is shifted to neutral as described later.

The operation of the steering system of the present invention as described above is as follows:

In starting the operation of the tractor from the positions of various elements as shown in FIGS. 2A and 2B, the main switch 52 is first switched from parking position P to starting position S while the steering switch mechanism 49 is manually switched to START position, so that the electromagnetic valve 48 is energized so as to be switched from OFF position to ON position. Thus, the hydraulic fluid from the source 126 is supplied through the valve 48 to the pressure receiving chambers 46, 47 of the parking brake cylinders 44L, 44R so that the parking brakes are brought to released positions, and, at the same time, the hydraulic fluid is supplied through the valve 48 to the respective valves 30, 31 and, whence to the respective first chambers 26, 27 of the cylinders 25L, 25R while the fluid in the respective second chambers 32, 33 of the cylinders 25L, 25R is drained through the respective shuttle valves 34, 35 and the valves 38, 41 to the sump, thereby switching both the steering brakes 8L, 8R to released positions so as to be ready for the running of the tractor. The running of the tractor in the straight advance is effected with both the transmissions 6L, 6R being engaged and both the steering brakes 8L, 8R being released while the lateral shaft engaging clutch 13 is engaged.

When the tractor is to be turned quickly rightwardly, the manually operable steering switch mechanism 49 is switched to the Right Quick Turn position. Then, the valves 31, 41, 23 and 24 are energized with the valve 48 being left energized so that the fluid in the first chamber 27 of the cylinder 25R is drained through the valve 31 while the fluid from the source 126 is introduced through the line 39, the shuttle valve 35 into the second chamber 33 of the valve 25R whereby the steering brake 8R is brought to braking position and, at the same time, the valve 23 is energized to supply fluid from the source 126 into the second chamber 19 of the cylinder 14R while the fluid in the first chamber 18 is drained so that the transmission 6R is shifted to neutral and the valve 24 is energized to supply fluid to the second chamber 21 of the cylinder 15 while the fluid in the first chamber 20 is drained so that the lateral shaft engaging clutch 13 is disengaged. Thus, the tractor is quickly turned to the right at a rate as determined by the constant pressure of the fluid supplied from the source 126 into the second chamber 33 of the cylinder 25R.

In the similar manner, when the tractor is to be turned to the left quickly, the manually operable steering switch mechanism 49 is switched to the Left Quick Turn position. Then, the valve 30 is energized instead of the valve 31 and the valve 38 is energized instead of the valve 41 and the valve 22 is energized instead of the valve 23 with the valves 48 and 24 held energized. Therefore, the cylinder 25L is actuated to bring the steering brake 8L to braking position instead of the steering brake 8R and the cylinder 14L is actuated to shift the transmission 6L to neutral instead of the transmission 6R so that the tractor is turned to the left quickly at a rate determined by the constant fluid pressure from the source 126 as in the case of the right quick turn.

When the tractor is to be turned slowly to the right, the manually operable steering switch mechanism 49 is switched to the Right Slow Turn position. Then, the valves 48 and 24 are held energized but the valves 30, 31, 38, 41 and 22 are deenergized while the valve 23 is energized. Thus, the first chambers 26, 27 of the cylinders 25L, 25R are supplied with the fluid while the fluid in the second chambers 32, 33 of the cylinders 25L, 25R is drained so that the steering brakes 8L, 8R are brought to released positions while the fluid is introduced into the second chamber 19 of the cylinder 14R through the valve 23 so that the transmission 6R is shifted to neutral with the lateral shaft engaging clutch 13 being held disengaged. Under such condition, when the rightside adjustable treadle pressure reducing valve 43 is actuated, the fluid the pressure of which is reduced to a desired value by the valve 43 depending upon the degree of actuation thereof is supplied through line 40 and the port 35b into the second chamber 33 of the cylinder 25R and, at the same time, the valve 31 is energized through the treadle valve coupled switch mechanism 50 mechanically coupled with the treadle pressure reducing valves 42, 43 by the actuation of the valve 43 so that the fluid in the first chamber 27 of the cylinder 25R is drained through the valve 31 thereby permitting the steering brake 8R to be brought to the braking position and the tractor to be turned to the right slowly at a rate as determined by the adjustably reduced pressure of the fluid depending upon the degree of actuation of the valve 43 which is introduced into the second chamber 33 of the cylinder 25R. In this case, the port 35a of the shuttle valve 35 is closed by the pressure of the fluid from the valve 43.

In the similar manner, when the tractor is to be turned to the left slowly, the steering switch mechanism 49 is switched to the Left Slow Turn position so as to energize the valve 22 instead of the valve 23 and the adjustable treadle pressure reducing valve 42 is actuated by the desired degree for supplying desired reduced pressure of the fluid to the second chamber 32 of the cylinder 25L. Since the valve 22 is energized through the steering switch mechanism 49 so as to shift the transmission 6L to neutral instead of the transmission 6R and the valve 30 is energized instead of the valve 31 through the switch mechanism 50 coupled with the actuation of the treadle valve 42 so as to drain the fluid in the first chamber 26 of the cylinder 25L, the steering brake 8L is brought to the braking position at the desired rate determined by the reduced pressure of the fluid so that the tractor is slowly turned to the left.

In this case, the port 34a of the shuttle valve 34 is closed by the fluid from the valve 42.

When both the treadle valve 42, 43 are actuated, the valves 48, 30, 31, 22, 23 are energized while the valve 24 is deenergized through the switch mechanism 50 so that the clutch 13 is held engaged and both the transmission 6L, 6R are shifted to neutral while both the steering brakes 8L, 8R are brought to the braking positions thereby stopping the tractor.

In order to effect emergency braking, the steering switch mechanism 49 is switched to the Emergency Brake position so as to deenergize all the valves 48, 30, 31, 38, 41, 22, 23 and 24, thereby effecting braking action by the parking brakes and the various elements are deactuated while the engine 1 is stopped so as to momentarily stop the tractor.

We claim:

1. A steering system for an endless track type tractor having an engine, a power distribution device connected to said engine for equally distributing the power of said engine to two output shafts of said power distribution device, a pair of power trains each connected to the respective one of said output shafts and including a torque converter, a coupling, a transmission, a steering brake for applying braking force to the output shaft of the transmission when the same is shifted to neutral position, a bevel gear mechanism connected to the output shaft of said transmission, a lateral output shaft connected to said bevel gear mechanism so as to be driven by the power of said torque converter through said transmission when said steering brake is in the disengaged position and a final reduction gear mechanism for transferring the power from said lateral output shaft to a sprocket for driving the endless track engaging around a portion of said sprocket, the braking by said steering brake of the output shaft of either one transmission when shifted to neutral position effecting the turning of the tractor rightwardly or leftwardly, a hydraulic fluid source, an electric source, a first pair of hydraulic cylinders each connected to said hydraulic fluid source and coupled with the respective transmission for shifting the same to neutral position upon actuation of said hydraulic cylinder, a second pair of hydraulic cylinders each connected to said hydraulic fluid source and coupled with the respective steering brake for braking said output shaft of said transmission upon actuation of said hydraulic cylinder, a first pair of electromagnetic valves connected to said electric source and each connected between the hydraulic fluid source and the respective hydraulic cylinder of said first pair for actuating the same upon energization of said valve, a second pair of electromagnetic valves connected to said electric source and each connected between said hydraulic fluid source and the respective hydraulic cylinder of said second pair for actuating the same upon energization of said valve, a manually operable steering switch mechanism connected to said electric source and said first and said second pair of electromagnetic valves for selectively energizing either one of said first pair of electromagnetic valves and either one of said second pair of electromagnetic valves so as to apply braking force to the output shaft of either one of said transmissions while the same is shifted to neutral position so that said tractor is turned rightwardly or leftwardly at a rate determined by the hydraulic fluid pressure of said hydraulic fluid source supplied to said second pair of hydraulic cylinders coupled with the respective steering brakes, wherein the improvement comprises a pair of adjustable pressure reducing valves each connected between said hydraulic fluid source and the respective one of said second pair of hydraulic cylinders in parallel to the respective electromagnetic valve of said second pair and a coupled switch mechanism operably coupled with the respective one of said adjustable pressure reducing valves and connected to said electric source and said first and said second pair of electromagnetic valves in parallel to said manually operable steering switch mechanism thereby permitting a selected one of said second pair of hydraulic cylinders to be actuated by one of said adjustable pressure reducing valves while said second pair of electromagnetic valves are regulated by said manually operable steering switch mechanism so as to supply no fluid to said second pair of hydraulic cylinders with the one of said first pair of hydraulic cylinders related to said selected one of said second pair of hydraulic cylinders being actuated to shift said transmission to neutral position so that said tractor is turned rightwardly or leftwardly at a rate determined by the fluid pressure adjusted depending upon the degree of actuation of said adjustable pressure reducing valve.

2. Steering system according to claim 1, further comprising a lateral shaft engaging clutch for engaging directly said lateral shafts to each other and for disengaging the direct coupling of said lateral shafts, a clutch coupled hydraulic cylinder connected to said hydraulic fluid source and coupled with said lateral shaft engaging clutch for engaging the same when hydraulically energized, and a clutch coupled electromagnetic valve connected between said hydraulic fluid source and said hydraulic cylinder and connected to said electric source and said manually operable steering switch mechanism so as to energize said hydraulic cylinder when both of said first pair and said second pair of hydraulic cylinders are in non-actuated positions.

3. Steering system according to claim 1, further comprising a pair of hydraulically operable parking brakes connected to said hydraulic fluid source and normally held in braking position but, when hydraulically energized, releasing braking force, and a parking brake coupled electromagnetic valve connected between said hydraulic fluid source and said parking brakes and connected to said electric source and said manually operable steering switch mechanism, said electromagnetic valve being energized through said steering switch mechanism when switched to starting position, thereby releasing said parking brakes.

4. Steering system according to claim 3, further comprising a third pair of electromagnetic valves connected to said electric source and said manually operable steering switch mechanism as well as to said coupled switch mechanism and each connected between said parking brake coupled electromagnetic valve and the respective one of said second pair of hydraulic cylinders thereby permitting either one of the latter to be ready for being actuated by the actuation of selected one of said third pair of hydraulic cylinders as determined by said coupled switch mechanism upon actuation of said parking brake coupled electromagnetic valve.

* * * * *